United States Patent
Tomczak et al.

(10) Patent No.: US 6,581,631 B2
(45) Date of Patent: Jun. 24, 2003

(54) DEVICE WITH A DIAPHRAGM ARRANGEMENT

(75) Inventors: Stanislaus Tomczak, Grossbottwar (DE); Roland Hoepel, Kempten (DE); Ralph Ittlinger, Weissach (DE); Volker Hudec, Rettenberg-Freidorf (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/959,264

(22) PCT Filed: Feb. 20, 2001

(86) PCT No.: PCT/DE01/00644
§ 371 (c)(1),
(2), (4) Date: Apr. 22, 2002

(87) PCT Pub. No.: WO01/63373
PCT Pub. Date: Aug. 30, 2001

(65) Prior Publication Data
US 2002/0134433 A1 Sep. 26, 2002

(30) Foreign Application Priority Data
Feb. 22, 2000 (DE) .......................................... 100 08 227

(51) Int. Cl.$^7$ .......................... G05D 16/06; F16K 41/12
(52) U.S. Cl. ........................................ 137/510; 92/98 R
(58) Field of Search .................................. 137/510, 505; 92/98 R; 123/459, 463

(56) References Cited

U.S. PATENT DOCUMENTS

| | | | | |
|---|---|---|---|---|
| 4,646,700 A | * | 3/1987 | Tuckey | 123/510 |
| 4,960,038 A | * | 10/1990 | Chiba et al. | 92/98 R |
| 5,609,138 A | * | 3/1997 | Mutschler | 123/463 |
| 6,029,694 A | * | 2/2000 | Schwegler et al. | 137/510 |

FOREIGN PATENT DOCUMENTS

| | | | |
|---|---|---|---|
| EP | 611908 | * | 8/1994 |
| EP | 796991 | * | 9/1997 |
| EP | 870957 | * | 10/1998 |

* cited by examiner

*Primary Examiner*—Stephen M. Hepperle
(74) *Attorney, Agent, or Firm*—Ronald E. Greigg

(57) ABSTRACT

A device with a diaphragm arrangement dividing two chambers from one another, in which the diaphragm arrangement is retained via a crimped connection, excellent restraint of the diaphragm arrangement and excellent sealing are attained with the aid of an elastomer material. The device may be a pressure valve, for instance, and serves to vary a pressure of a fuel supply system of a motor vehicle.

20 Claims, 2 Drawing Sheets

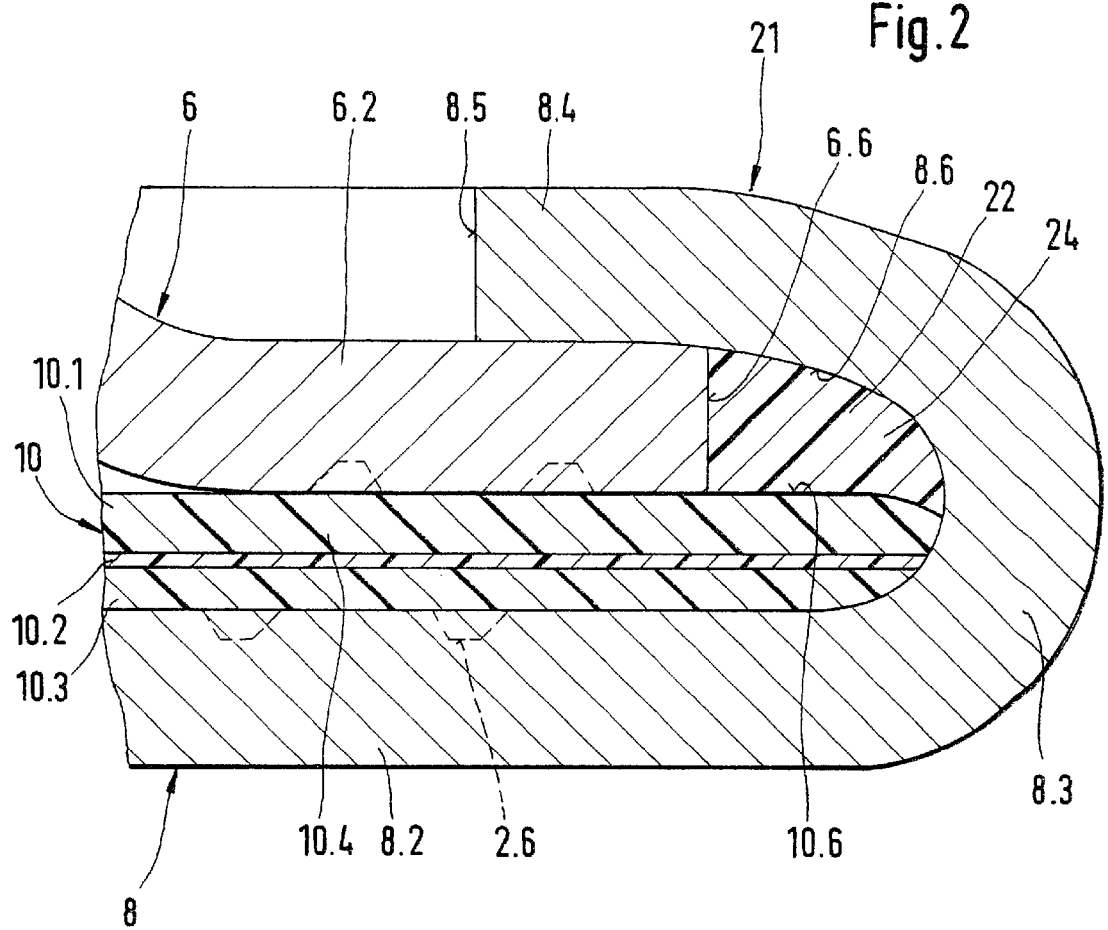

US 6,581,631 B2

DEVICE WITH A DIAPHRAGM ARRANGEMENT

CROSS-REFERENCE TO RELATED APPLICATIONS

This application is a 35 U.S.C. 371 application of PCT/DE01/00644, filed on Feb. 20, 2001.

BACKGROUND OF THE INVENTION

1. Field of the Invention

The invention is directed to a device with a diaphragm arrangement and more particularly to such a device in which a diaphragm is secured in place between two retaining elements crimped together.

2. Brief Description of the Prior Art

European Patent EP 0 585 810 B1 shows a device for the diaphragm arrangement, having a first retaining element and a second retaining element. The diaphragm arrangement is fastened between the two retaining elements. An encompassing bead is formed onto the outer circumference of the diaphragm arrangement. The bead is located in an encompassing groove provided in the lower retaining element. In this arrangement it is disadvantageous that the encompassing bead formed onto the diaphragm arrangement increases the effort and expense of producing the diaphragm arrangement considerably, and in this diaphragm arrangement, a multi-layer construction of the diaphragm arrangement is practically impossible. Another disadvantage is that because of the encompassing groove, producing the lower retaining element requires considerably more effort and expense.

U.S. Pat. No. 4,825,835 shows a pressure valve with a diaphragm arrangement fastened between two retaining elements. There is an encompassing bead on the outer edge of the diaphragm arrangement. The bead rests in an encompassing groove provided on one of the two retaining elements. Because of the encompassing groove, it is very complicated to produce the retaining element that has the groove; in particular, the retaining element must be reshaped quite severely and made to assume a complicated shape. Because of the complicated shape of the retaining element, otherwise conventional materials cannot be used, and rapid wear of the stamping tool used in producing the retaining element must be feared.

U.S. Pat. No. 2,318,157 shows a device with a diaphragm arrangement fastened between two retaining elements. When the upper retaining element is crimped on, the outer edge of the diaphragm arrangement is bent over the outer edge of the lower retaining element. However, in this arrangement it must be feared that the diaphragm arrangement will become damaged at its fastening point during the crimping over of the retaining element. Because of the bending over of the diaphragm arrangement, diaphragms comprising multiple layers cannot be used.

German Published, Nonexamined Patent Application DE-OS 29 13 423 shows a device with a diaphragm arrangement fastened between two retaining elements. A sealing ring is additionally provided. Because the additional sealing ring is only very inadequately compartmentalized, subsidence and resultant leaks must be feared. Another factor is that the sealing ring cannot provide sealing directly in the region of the diaphragm fastened in place.

German Published, Nonexamined Patent Application DE-OS 29 24 796 shows a device with a sealing ring fastened to the crimped connection. The sealing ring is located in a sealing ring groove. Because of the requisite sealing ring groove, a diaphragm arrangement that is simple to produce cannot be used.

SUMMARY OF THE INVENTION

The device with a diaphragm arrangement according to the invention has the advantage over the prior art that at very little production effort and expense, especially when a crimped connection that is easy to manipulate is used, excellent fastening of the diaphragm arrangement and excellent sealing off of the crimped connection are attainable.

Another advantage is that because of the excellent restraint of the diaphragm arrangement in the region of the crimped connection, the component size of the device in the region of the crimped connection can be made rather small. In particular, only relatively slight wall thicknesses are required for the retaining elements without the need to fear impermissible deformation; or the hydraulic pressure inside the device can be chosen to be relatively high.

Often, the diaphragm arrangement has a surface comprising an elastomer on at least one side. The elastomer surface of the diaphragm arrangement, together with the elastomer material fastened in place in the compression chamber, has especially high frictional resistance; as a result, whenever the surface of the diaphragm arrangement, at least in the region of the elastomer material fastened in place, comprises an elastomer, an especially good, secure restraint of the diaphragm arrangement and thus an especially great and durable operating safety of the device are attained.

BRIEF DESCRIPTION OF THE DRAWINGS

A preferred, especially advantages exemplary embodiment of the invention is described herein below, with reference to the drawings, in which:

FIG. 2 shows a detail marked II in FIG. 1.

DESCRIPTION OF THE PREFERRED EMBODIMENT

Figure 1:
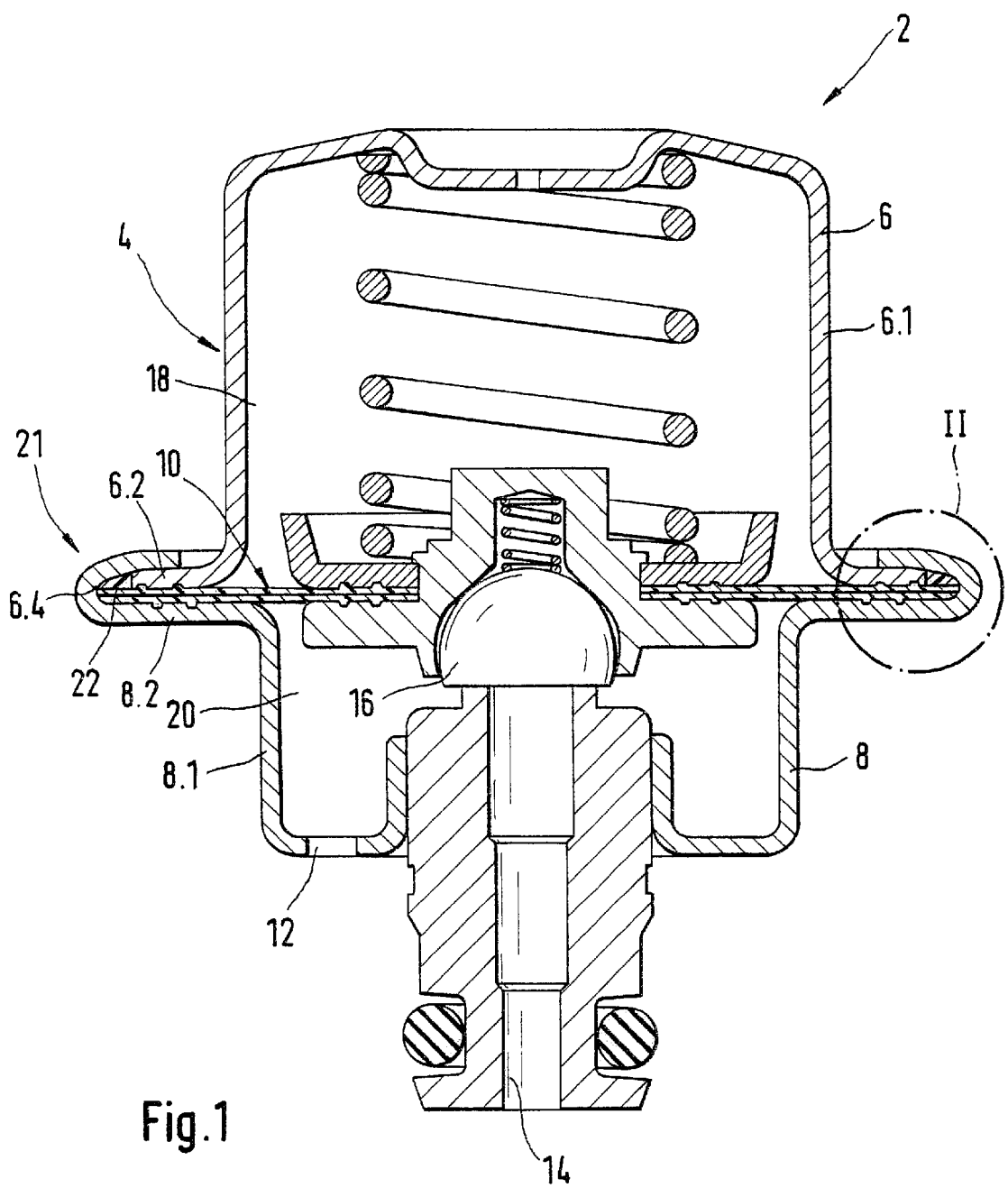
FIG. 1 shows a longitudinal section through an exemplary embodiment.

The device with a diaphragm arrangement according to the invention can be used whenever a diaphragm arrangement is fastened in place between two retaining elements crimped to one another.

The device is for instance a hydraulic pressure reservoir, in which a liquid is located on one side of the diaphragm arrangement, for instance, and a gas under pressure is located on the other side of the diaphragm arrangement.

The device can, however, also be a pressure valve, for example, in which the liquid whose hydraulic pressure is to be controlled is located on one side of the diaphragm arrangement, and atmospheric pressure, for instance, or a reference pressure is located on the other side of the diaphragm arrangement. The pressure valve is used for instance for controlling or regulating a pressure of fuel in a fuel supply system of an internal combustion engine. An Otto engine can for instance be considered as the internal combustion engine. The fuel is for instance gasoline or Diesel fuel.

FIG. 1 shows a longitudinal section through a preferred, especially advantageous exemplary embodiment. FIG. 2 is an enlargement of a detail marked II in FIG. 1.

In all the drawings, elements that are the same or function the same are assigned the same reference numerals. Unless otherwise noted or shown in the drawing, what is said and shown for one of the drawings applies to the other drawings as well. Unless otherwise stated in the description, details of the various drawings can be combined with one another.

FIG. 1 shows a device embodying the invention, in the exemplary embodiment chosen, the device is a pressure valve 2. The pressure valve 2 has a housing 4 which substantially comprises a first retaining element 6 and a second retaining element 8. There is a diaphragm arrangement 10 inside the housing 4. The pressure valve 2 has an inflow connection 12 and a continuing connection 14. In its middle region, the diaphragm arrangement 10 is joined in pressure-tight fashion to a valve body 16. The valve body 16 serves as a closing body. Above the diaphragm arrangement 10, the pressure valve 2 has a control chamber 18, and below the diaphragm arrangement 10, the pressure valve 2 has a pressure chamber 20. Depending on the pressure of the pressure medium in the inflow connection 12, the valve body 16 lifts more or less far from a valve seat, so that at elevated pressure the pressure medium can flow out of the pressure chamber 20 into the continuing connection 14.

The two retaining elements 6 and 8 are joined firmly to one another and in pressure-tight fashion via a crimped connection 21. The first retaining element 6 has a cylindrical jacket face 6.1. On the end toward the second retaining element 8, the cylindrical jacket face 6.1 is bent over on the outside all the way around, so that a flange 6.2 extending essentially radially is formed there. The flange 6.2 of the first retaining element 6 ends in an encompassing end face 6.6. The end face 6.6 points radially outward. The first retaining element 6 is preferably produced from a piece of sheet metal by being stamped out and shaped. Viewed longitudinally of the pressure valve 2, the width of the end face 6.6 is approximately equal to the thickness of the sheet metal from which the first retaining element 6 is produced. The second retaining element 8 has an essentially cylindrical jacket face 8.1. Toward the first retaining element 6, the cylindrical jacket face 8.1 is bent over toward the outside and there forms a counterpart flange 8.2. In the region of the outer circumference of the counterpart flange 8.2, the retaining element 8 is bent over yet again at an encompassing bent-over point 8.3. At the bent-over point 8.3, the second retaining element 8 is bent over, for instance by 160° (degrees) to 180° (degrees); in the ideal case, the angle is 180°. The region, bent over by up to 180°, of the second retaining element 8 will hereinafter be called the crimped overlap 8.4. The crimped overlap 8.4 ends radially on the inside at an encompassing end 8.5. The second retaining element 8 is likewise preferably produced from a piece of sheet metal by stamping and shaping. Viewed longitudinally of the pressure valve 2, the width of the encompassing end 8.5 is approximately equal to the thickness of the sheet metal from which the second retaining element 8 is produced.

The outer circumferential region 10.4 of the diaphragm arrangement 10 is fastened in place firmly and in pressure-tight fashion in the crimped connection 21 between the flange 6.2 and the counterpart flange 8.2.

Viewed in the radial direction, the diaphragm arrangement 10 protrudes past the end face 6.6 of the first retaining element 6. The part of the diaphragm arrangement 10 protruding radially past the end face 6.6 will hereinafter be called the projecting region 10.6. The projecting region 10.6 forms a face that forms an angle of approximately 90° (degrees) with the end face 6.6. Before the crimped overlap 8.4 is folded over onto the flange 6.2 of the first retaining element 6, an elastomer material 22 is put in place at the place where the end face 6.6 and the region of the diaphragm arrangement 10 that projects past the end face 6.6 abut one another. In the folding over of the crimped overlap 8.4 of the second retaining element 8 onto the flange 6.2 of the first retaining element 6, a compression chamber 24 is created between the end face 6.6 and the projecting region 10.6 and a compression region 8.6 of the second retaining element 8, because of the elastomer material 22. The elastomer material 22 is pressed into the compression chamber 24 or in other words squeezed in. Because even with great force the elastomer material 22 cannot be compressed arbitrarily, the compression chamber 24, given adequate dimensioning of the elastomer material 22 placed in it, is larger than a chamber that would be created without the elastomer material 22. The volume of the elastomer material 22 determines the size of the compression chamber 24.

The lever arm between the end 8.5 of the crimped overlap 8.4 and the bent-over point 8.3 is substantially greater than the mean spacing between the compression region 8.6 and the bent-over point 8.3. The result is a mechanical advantage and a stepup of the operative forces. When the two retaining elements 6 and 8 are crimped together, if the crimped overlap 8.4 in the region of its end 8.5 is pressed from above, in terms of the drawings that are part of this application, is pressed against the flange 6.2 of the first retaining element 6, then, because the lever arm between the end 8.5 and the bent-over point 8.3 is substantially greater than the mean lever arm between the compression region 8.6 and the bent-over point 8.3, the elastomer material 22 is pressed with a force that is substantially greater than the force with which the crimped overlap 8.4 in the region of the end 8.5 is pressed against the flange 6.2. As a result, inside the compression chamber 24, a very major squeezing of the elastomer material 22 takes place. Because of the major squeezing, the elastomer material 22 fills up the compression chamber 24 practically completely.

Because of the major squeezing of the elastomer material 22, the elastomer material 22 presses with great force against the face of the projecting region 10.6 of the diaphragm arrangement 10. The elastomer material 22 presses the diaphragm arrangement 10 at its circumference against the counterpart flange 8.2 of the second retaining element 8 with great force.

In previously known devices, when during operation a major and highly fluctuating hydraulic pressure acted on the diaphragm arrangement in the pressure chamber, in these previously known devices this often led to the diaphragm arrangement being pulled out of the crimped connection.

Because of the major squeezing of the elastomer material 22 and the resultant major forces, or because of the high pressure per unit of surface area between the projecting region 10.6 and the elastomer material 22 and facing it between the outer circumferential region 10.4 of the diaphragm arrangement 10 and the counterpart flange 8.2, the diaphragm arrangement 10 is restrained and sealed off substantially better than in previously known devices. This makes it possible to allow especially high hydraulic pressures in the pressure chamber 20, and even dynamically highly fluctuating pressures, even if only relatively slight wall thickness for the retaining elements 6 and 8 are employed.

An especially high hydraulic pressure in the pressure chamber 20, which can be up to about ten times as high as was previously usual, does, however, lead to a slight expansion of the crimped connection 21 at the end 8.5 of the crimped overlap 8.4. However, in the region of the bent-over point 8.3 of the crimped connection 21 this widening is not perceptible. Thus even at a high hydraulic pressure in the pressure chamber 20, there is no lessening, or practically no lessening, of the squeezing of the elastomer material 22. Thus even at very high hydraulic pressures in the pressure chamber 20, the effect intended by the elastomer material 22 is preserved practically completely.

The diaphragm arrangement 10 can comprise multiple layers. In the preferred exemplary embodiment, the diaphragm arrangement 10 includes an upper layer 10.1, a middle layer 10.2, and a lower layer 10.3. The three layers 10.1, 10.2, 10.3 are firmly bonded to one another, for instance by vulcanization. Since each of the three layers 10.1, 10.2 and 10.3 has a constant thickness throughout, although each layer can have a different layer from the others, the diaphragm arrangement 10 can be produced very easily, for instance by being stamped out of a larger flat plate. Stamping the diaphragm arrangement 10 out of an easily produced plate would be practically impossible if an encompassing bead were formed onto the diaphragm arrangement.

As the exemplary embodiment shown illustrates, the diaphragm arrangement 10 remains practically flat even in the region of the crimped connection 21. In other words, the diaphragm arrangement 10 need not be bent over in the region of the crimped connection 21. This allows the use of even a diaphragm arrangement 10 that because of its composition would not withstand major bending without being damaged.

Encompassing channels could optionally be provided on the faces toward the diaphragm arrangement 10 of the flange 6.2 and of the counterpart flange 8.2. The channels 26 can improve the restraint of the diaphragm arrangement 10. Because of the good hold via the elastomer material 22, it is often possible to dispense with the channels 26, which is why the channels 26 are not shown in solid lines in FIG. 2 but rather in dashed lines.

The upper layer 10.1 for instance comprises an elastomer. If the diaphragm arrangement 10 comprises an elastomer, at least where the elastomer material 22 presses against the diaphragm arrangement 10, then especially high coefficients of friction occur between the diaphragm arrangement 10 and the elastomer material 22 in the compression chamber 24, so that the restraint of the diaphragm arrangement 10 inside the crimped connection 21 can be still further improved thereby.

The foregoing relates to preferred exemplary embodiments of the invention, it being understood that other variants and embodiments thereof are possible within the spirit and scope of the invention, the latter being defined by the appended claims.

We claim:

1. A device with a diaphragm arrangement, the device comprising a first retaining element (6), a second retaining element (8), the first retaining element (6) and the second retaining element (8) being connected to one another via a crimped connection (21) with the diaphragm arrangement (10) being fastened at its circumferential region (10.4) between the first retaining element (6) and the second retaining element (8) in the region of the crimped connection (21), the first retaining element (6) having a flange (6.2) extending essentially parallel to the diaphragm arrangement and ending in an encompassing end face (6.6), the second retaining element (8) having both a counterpart flange (8.2), extending essentially parallel to the diaphragm arrangement (10), and a crimped overlap (8.4), the crimped connection (21) being formed by bending the crimped overlap (8.4) over the circumferential region (10.4) of the diaphragm arrangement (10) and over the encompassing end face (6.6) of the first retaining element (6), the circumferential region (10.4) of the diaphragm arrangement (10) protruding radially with a projecting region (10.6) past the end face (6.6) of the first retaining element (6), and an elastomer material (22) fastened in a compression chamber (24) that adjoins both the end face (6.6) of the first retaining element (6) and the projecting region (10.6) of the diaphragm arrangement (10) as well as the crimped overlap (8.4) of the second retaining element (8).

2. The device with a diaphragm arrangement of claim 1, wherein the diaphragm arrangement (10) is built into an interior of a housing (4) and divides the interior into a first chamber (18) and a second chamber (20).

3. The device with a diaphragm arrangement of claim 2, wherein the first retaining element (6) forms a partial region of the housing (4).

4. The device with a diaphragm arrangement of claim 2, wherein the second retaining element (8) forms partial region of the housing (4).

5. The device with a diaphragm arrangement of claim 3, wherein the second retaining element (8) forms partial region of the housing (4).

6. The device with a diaphragm arrangement of claim 1, wherein the diaphragm arrangement (10) has a valve body (16) that is movable transversely to the diaphragm arrangement (10).

7. The device with a diaphragm arrangement of claim 2, wherein the diaphragm arrangement (10) has a valve body (16) that is movable transversely to the diaphragm arrangement (10).

8. The device with a diaphragm arrangement of claim 1, wherein the crimped overlap (8.4) is bent over essentially by 180° (degrees) relative to the counterpart flange (8.2) at a bent-over point (8.3) adjoining the counterpart flange (8.2).

9. The device with a diaphragm arrangement of claim 2, wherein the crimped overlap (8.4) is bent over essentially by 180° (degrees) relative to the counterpart flange (8.2) at a bent-over point (8.3) adjoining the counterpart flange (8.2).

10. The device with a diaphragm arrangement of claim 6, wherein the crimped overlap (8.4) is bent over essentially by 180° (degrees) relative to the counterpart flange (8.2) at a bent-over point (8.3) adjoining the counterpart flange (8.2).

11. The device with a diaphragm arrangement of claim 1, wherein the elastomer material (22) is an encompassing ring.

12. The device with a diaphragm arrangement of claim 2, wherein the elastomer material (22) is an encompassing ring.

13. The device with a diaphragm arrangement of claim 6, wherein the elastomer material (22) is an encompassing ring.

14. The device with a diaphragm arrangement of claim 8, wherein the elastomer material (22) is an encompassing ring.

15. The device with a diaphragm arrangement of claim 1, wherein the diaphragm arrangement (10), at least in a region adjacent to the elastomer material (22), has a surface comprising an elastomer (10.1).

16. The device with a diaphragm arrangement of claim 2, wherein the diaphragm arrangement (10), at least in a region adjacent to the elastomer material (22), has a surface comprising an elastomer (10.1).

17. The device with a diaphragm arrangement of claim 1, wherein the device is a pressure valve (2), with an inflow connection (12) and with a continuing connection (14).

18. The device with a diaphragm arrangement of claim 2, wherein the device is a pressure valve (2), with an inflow connection (12) and with a continuing connection (14).

19. The device with a diaphragm arrangement of claim 1, wherein the diaphragm arrangement (10) has at least two layers (10.1, 10.2, 10.3), and each of the layers (10.1, 10.2, 10.3) has an essentially constant thickness.

20. The device with a diaphragm arrangement of claim 2, wherein the diaphragm arrangement (10) has at least two layers (10.1, 10.2, 10.3), and each of the layers (10.1, 10.2, 10.3) has an essentially constant thickness.

* * * * *

UNITED STATES PATENT AND TRADEMARK OFFICE
CERTIFICATE OF CORRECTION

PATENT NO.     : 6,581,631 B2
DATED          : June 24, 2003
INVENTOR(S)    : Stanislaus Tomczak et al.

It is certified that error appears in the above-identified patent and that said Letters Patent is hereby corrected as shown below:

<u>Title page,</u>
Item [75] to read as follows:
-- [75] Inventors: Stanislaus Tomczak, Grossbottwar (DE), Roland Hoepfl, Kempten (DE); Ralph Ittlinger, Weissach (DE); Volker Hudec, Rettenberg-Freidorf (DE) --

Signed and Sealed this

Seventh Day of October, 2003

JAMES E. ROGAN
*Director of the United States Patent and Trademark Office*